Sept. 9, 1969 R. A. BETH 3,466,499
CANCELLATION OF EXTERNAL MAGNETIC FIELDS BY INNER AND OUTER
CYLINDRICAL CURRENT SHEETS
Filed March 27, 1967 2 Sheets-Sheet 1

INVENTOR.
RICHARD A. BETH
BY
Roland A. Anderson
Attorney

INVENTOR.
RICHARD A. BETH

United States Patent Office 3,466,499
Patented Sept. 9, 1969

3,466,499
CANCELLATION OF EXTERNAL MAGNETIC
FIELDS BY INNER AND OUTER CYLINDRI-
CAL CURRENT SHEETS
Richard A. Beth, Bellport, N.Y., assignor to the United
States of America as represented by the United States
Atomic Energy Commission
Filed Mar. 27, 1967, Ser. No. 626,674
Int. Cl. H01j 1/52, 5/02
U.S. Cl. 315—85                                6 Claims

ABSTRACT OF THE DISCLOSURE

Apparatus providing zero external magnetic fields and high internal magnetic fields by means of inner and outer, longitudinally extending, parallel conductors forming inner and outer, coaxial, cylindrical, current sheets for transporting charged atomic particles along a beam axis.

---

This invention was made in the course of, or under, a contract with the United States Atomic Energy Commission.

CROSS-REFERENCE TO RELATED APPLICATIONS

Ser. No. 507,256, Sampson et al., filed Nov. 10, 1965, now U.S. Patent 3,356,976.

Ser. No. 591,056, Sampson et al., filed Oct. 28, 1966, now U.S. Patent 3,423,706.

BACKGROUND OF INVENTION

In high energy accelerators, such as described and shown in U.S. Patent 3,171,025, issued Feb. 23, 1965, by T. L. Collins, strong and accurate magnetic fields are required for focusing high energy charged particle beams circulating along a straight or an endless equilibrium orbit. However, the magnets described in this patent, as well as those described and shown in the above-cited Sampson et al. patents, either produce undesirable external magnet felds that make it difficult or impossible to arrange or use field sensitive beam measuring, control and/or deflecting equipment in close proximity to the high energy charged particle beam transported by these magnets or iron outside these magnets becomes magnetized so as to distort or change the desired internal magnetic field. It is also desirable to provide magnetic shields having a wide range of shapes and sizes and that effectively produce zero external magnetic fields around a wide range of magnetic field strengths, shapes and sizes for accurately transporting a high energy beam of charged particles over a wide range of energies and beam diameters.

It is an object of this invention, therefore, to provide a practical and efficient apparatus and method for producing a strong and accurate internal magnetic charged particle beam transporting field and a zero external magnetic field by providing an inner magnetic current sheet and an outer magnetic current sheet having internal magnetic field lines that cancel the external field around both the inner and the outer magnets.

It is another object to provide a means for shielding a magnet in such a way as to avoid introducing any vertical or horizontal components of force that might adversely affect the path of a charged particle beam therethrough.

A further object is to provide means for actively shielding a magnet having a wide range of magetic field strengths, sizes and shapes.

A still further object is to provide a constant gradient charged particle beam focusing system having a zero external magnetic field.

SUMMARY OF THE INVENTION

The foregoing objects are achieved in accordance with this invention by providing inner and outer coaxial, cylindrical current sheets. More particularly, in one embodiment, this invention provides two superconducting confocal, cylindrical, opposite, elliptical, current sheets that cancel the extenal field and accurately produce a high internal constant gradient magnetic focusing field. With the proper selection of conductors, as described in more detail hereinafter, the desired field can be produced with normal resistance and/or superconducting materials and the field can be either a single function or combined function bending and/or focusing field in an aperture having an elliptical or a circular cross-section.

Various other advantages and novel features will now appear from the following description of an embodiment of this invention, and the novel features will be particularly pointed out hereinafter in connection with the appended claims.

BRIEF DESCRIPTION OF THE DRAWINGS

In the drawings where like elements are referenced alike.

DESCRIPTION OF THE PREFERRED EMBODIMENTS

It is known that beams of charged particles can be bent by standard dipole magnets and focused by standard quadrupole magnets having a constant gradient magnetic field therein. Normal resistance dipoles and quadrupoles are shown and discussed in the above cited Collins patent. A superconducting quadrupole is shown and discussed in the above cited copending applications, which are assigned to the assignee of this application. Combined dipole bending and constant gradient focusing magnets for a charged particle beam are also described in the above cited Sampson et al. patents.

In accordance with the above cited Sampson et al. patents single function constant gradient focusing magnets or combined function bending and constant gradient focusing magnets can be made with superconductors and without iron cores. These magnets produce magnetic field strengths of 10–40 kilogauss or more with linear current densities of up to 22,000 amperes/cm. and 63,000 amperes/cm. of circumference or more. Moreover, these magnets can provide aperture cross-sections of circles and ellipses. In this regard, the elliptical cross-section is general to the special case of the circular cross-section. In each case the bending and/or the focusing is based on the fact that the particles making up a particular beam have substantially the same momentum. The mathematics of such focusing and/or bending systems are now well known in the art.

The invention hereinafter described utilizes a focusing and/or bending system of this type in which a cylindrical space around the magnet, which normally has widely extending external magnetic field lines running therethrough due to the field strength capabilities of the magnet and the lack of an iron core therein, is subjected to and circumscribed by a corresponding outer coaxial magnetic field in a manner described below in connection with particular configurations of these magnetic systems. A mathematical treatment of the principles involved in this invention is given in my articles in the following Brookhaven National Laboratory reports: AADD–102, entitled "Fields Produced by Cylindrical Current Arrays," dated Mar. 25, 1966; AADD–103, entitled "Combination of Cylindrical Current Sheets to Cancel External Field," dated Mar. 29, 1966, and published as BNL 10143; AADD–110, entitled "Elliptical Current Sheets to Produce Constant Gradient Field," dated June 10, 1966, and published as BNL 10341; and AADD–112, entitled "Fields Produced by Elliptical Current Sheets," dated July 6, 1966. AADD–102 and 112 are BNL 10148 and 10436.

Figure 1:
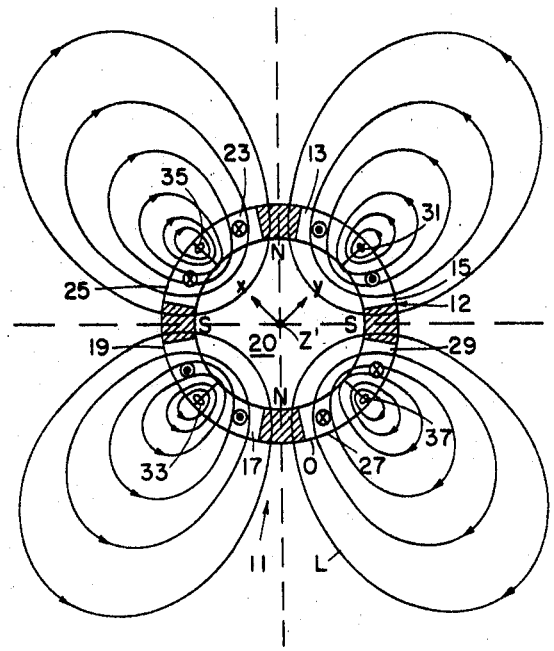
FIGURE 1 is a partial cross-sectional view of elements providing a cylindrical current sheet for producing an internal, constant gradient, quadrupole magnetic, beam focusing field.

In order to explain how the method and apparatus of this invention accomplish the function of shielding a constant gradient, quadrupole magnetic field by means of a corresponding outer coaxial magnetic field to provide a zero external magnetic field, reference is made to FIGURE 1 wherein is illustrated in cross-section a straight portion of a longitudinally extending, endless $Z'$ axis of a charged particle beam in a cyclic accelerator, such as described in U.S. Patent 3,171,025, dated Feb. 23, 1965, by T. L. Collins and assigned to the assignee of this invention. Disposed along the $Z'$ axis are a plurality of focusing lenses 11, one of which is shown for ease of explanation. Each lens is a quadrupole paired with a mating quadrupole disposed at 90° to its mate, as is understood in the art, and tends to focus the particles passing therethrough in some particular plane, such as either the X or Y planes at right angles to each other and passing through the $Z'$ axis. This provides the well known strong or alternating gradient focusing effect for achieving small amplitude betatron oscillations in accelerating charged particles to high energies as described in this patent and as is well known.

In accordance with the quadrupole magnetic field systems described in the above cited copending applications, each system forms a cylindrical current sheet that provides for opposite north poles in a first plane N—N passing through the $Z'$ axis and two opposite south poles in a second plane S—S passing through the $Z'$ axis at right angles to the first plane and disposed at 45° to the X and Y planes. To this end, as shown in FIG. 1, an annular cylindrical current sheet 12 conducts current in longitudinaly extending, current elements 13, 15, 17 and 19 in one direction around aperture 20 and in like current elements 23, 25, 27 and 29 in the opposite direction around aperture 20. This is illustrated for ease of explanation by a dot in a circle to indicate current flow in these elements in a normal direction up from the plane of the paper and by a cross in a circle to indicate the opposite direction of current flow.

Figure 2:
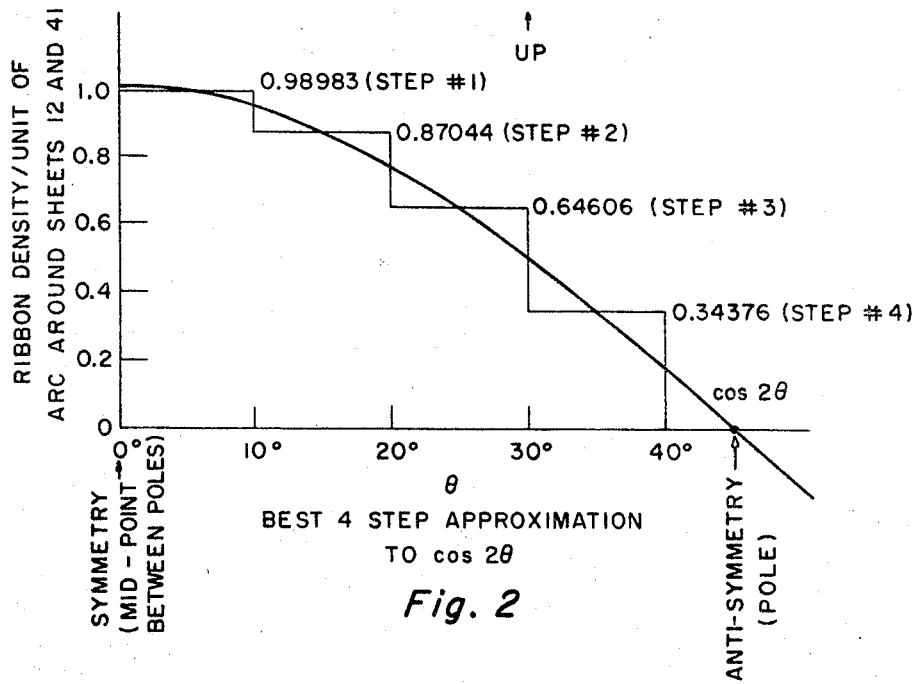
FIGURE 2 is a partial graphic illustration of the step dimensions of one embodiment of the quadrupole magnet of FIG. 1.

As described in the cited copending applications, the conductors are in the form of adjacent coils of superconducting ribbons banded together to form a hollow cylindrical current sheet with suitable stepping shims between the turns of ribbon. For quadrupole magnets, these stepped conductors produce the current distribution in which the current $dI=I_0 \cos 2\theta d\theta$ flows in the arc interval corresponding to $d\theta$. Suitable dimensions for each step of one embodiment are shown in FIG. 2. This produces adjacent, cylindrical, closed magnetic lines of force around longitudinally extending null lines of force 31, 33, 35 and 37 in the well known constant circular cross-section, cylindrical, quadrupole, gradient configuration.

As is well known, the magnetic field lines of a force in the adjacent four quadrants of a quadrupole magnet circulate in closed or endless loops in opposite directions. Thus, the field lines intersect the vertical X plane at right angles in a clockwise direction and the field lines intersect the horizontal Y plane at right angles in a counterclockwise direction. However, at the interface planes between the four adjacent quadrants the adjacent field lines rotate in the same direction with the field lines rotating inwardly toward the $Z'$ axis to form the opposite south poles intermediate the north poles. It is also noted that the field lines are uniformly bunched inside the cylindrical current sheet 12 forming aperture 20 to provide an inner constant gradient magnetic field and are widely diverging coaxially outside the current sheet 12 with field lines L forming endless loops that are widely and outwardly eccentrically off-centered from null lines 31, 33, 35 and 37.

Figure 3:
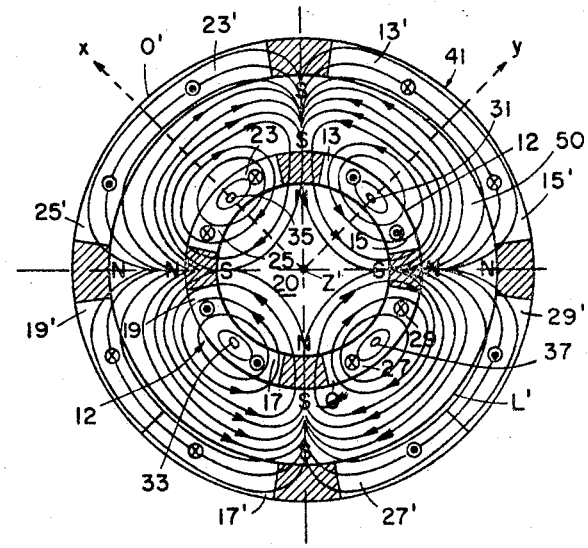
FIGURE 3 is a partial cross-sectional view of an outer cylindrical current sheet around the elements of FIG. 1.

Should a corresponding, oppositely directed, weaker, outside, concentric, circular cross-section, cylindrical current sheet 41 having a radius twice the inner current sheet be provided around the inner current sheet 12, as shown in FIGURE 3, the inner field produced by the outer current sheet 41 squashes the outer field lines of the inner current sheet into the desired small space to provide the desired constant gradient internal field while cancelling all the external magnetic field lines around the outer current sheet.

In one example for the required current distribution on coaxial right circular cylinders to produce an inner, ideal, constant gradient quadrupole field with an inner cylinder radius $a$ of 9.0 cm., an outer concentric cylinder radius $b$ of 18.0 cm., an inside field on the $Z'$ axis of 10,000 gauss having a $G/B$ of 0.0425 cm.$^{-1}$ where B gauss is the field at the aperture centerline ($Z=0$) and G gauss/cm. is the gradient, the required linear current densities for producing a zero external magnetic field are, in amperes/centimeter:

$$\frac{10}{a}\frac{dI}{d\theta}=-21{,}220 \cos \theta - 6{,}493 \cos 2\theta$$

and $$\frac{10}{b}\frac{dI'}{d\theta}=5{,}305 \cos \theta + 812 \cos 2\theta$$

with a maximum density on the high field side of the inner cylinder of about 27,700 amperes/cm. This compares to a conventional constant gradient field magnet, described in the above cited copending application of:

$$\frac{10}{a}\frac{dI}{d\theta}=-15{,}915 \cos \theta - 6{,}088 \cos 2\theta \text{ amperes/cm.}$$

for a single $a=9.0$ cm. radius cylinder, with maximum current density of about 22,000 amperes/cm.

Thus, as shown in FIG. 3, the inner and outer current sheet elements differ only in radius and a relative rotation of 90°. The inner field lines around null lines 31, 33, 35 and 37, still circulate in the same directions around these null lines, although the null lines are moved inwardly slightly in current sheet 12. All the outer field lines of the inner current sheet, however, are now in the aperture 50 between the inner and outer current sheets and the field lines closest to the inner and outer current sheets generally conform to the arc of curvature of the adjacent outside O or O' of their respective inner or outer current sheets except at the pole apertures thereof. On planes through these apertures on their midpoints or pole lines as a reference, the field lines of the adjacent quadrants tend to be squeezed together to converge in the apertures of the inner current sheet. Correspondingly, the inner field lines within the inner current sheet tend to curve endlessly toward a convergence in the apertures of the inner current sheet. Also, the inner and outer pole axes coincide but are opposite in sign since the inner and outer sheets are rotated relatively 90°, i.e. their respective current directions are reversed. The result is a zero field on axis Z′, a zero magnetic field from the outside O′ of the outer current sheet 41 outwardly, and an everywhere increasing field from the outside O′ inwardly and from the Z axis outwardly toward null lines 31, 33, 35 and 37.

It is further possible to eliminate the external or stray field completely while producing the prescribed inner field by adding a second confocal elliptic (or coaxial circular) current sheet. Formulas are given for the required current distributions.

The components of a two-dimensional magnetic field parallel to the $x$, $y$ plane are real functions of the coordinates $H_x(x, y)$ and $H_y(x, y)$. In empty space without currents Maxwell's equations, $$\frac{\partial H_y}{\partial x} = \frac{\partial H_x}{\partial y}$$

and $$\frac{\partial H_y}{\partial y} = -\frac{\partial H_x}{\partial x}$$

constitute Cauchy-Riemann equations which show that the complex combination of the components $$H = H_y(x, y) + iH_x(x, y) \quad (1)$$

is an analytic function of the complex variable $z = x + iy$. We can therefore represent the most general nonsingular field in the vicinity of the origin as a power series in $z$:

$$H(z) = H_2 z + H_3 z^2 + \ldots = \sum_{n=1}^{\infty} H_n z^{n-1} \quad (2)$$

The complex coefficients $H_n$ completely specify $H(z)$. In particular, $H_1$ specifies the dipole component, $H_2$ the quadrupole, $H_3$ the sextupole, and, in general, $H_n$ the $2n$-pole component.

The $x$-axis represents a "median plane" when $H_x = 0$ for $y = 0$, that is, when $H(z)$ is real for $z = x$. Hence all the coefficients $H_n$ are real for a median plane field.

To produce any prescribed field (2) within a given elliptic cylinder by currents flowing along the elements of the cylinder, we may use the following version of earlier results.

Let a normal section of the cylinder be the ellipse $$z = a \cos \theta + ib \sin \theta \quad (3)$$

where $a$ and $b$ are the given semiaxes, and $\theta$ is a parameter which goes from 0 to $2\pi$ around the ellipse. For $a > b$ we define the real quantities:

$$c^2 = a^2 - b^2$$

$$r = \frac{a+b}{2}$$

$$k = \frac{c}{2} \quad (4)$$

The foci of the ellipse lie at $z = \pm c$. Transition to the case of a circular cylinder of radius $r$ implies $a \to b \to r$, $c \to 0$, $k \to 0$, and $$z = re^{i\theta} \quad (3')$$

From the coefficients $H_n$ of the prescribed field we compute the complex values of $$F_m = \sum_{n=m}^{\infty} D_{mn} k^{n-m} H_n$$

using the $D_{mn}$ values given in Table I. By means

TABLE I.—VALUES OF $D_{mn}$ IN EQUATION 5

| n= | 1 | 2 | 3 | 4 | 5 | 6 | 7 | 8 |
|---|---|---|---|---|---|---|---|---|
| m=1 | 1 | 0 | 1 | 0 | 2 | 0 | 5 | 0 |
| m=2 |   | 1 | 0 | 2 | 0 | 5 | 0 | 14 |
| m=3 |   |   | 1 | 0 | 3 | 0 | 9 | 0 |
| m=4 |   |   |   | 1 | 0 | 4 | 0 | 14 |
| m=5 |   |   |   |   | 1 | 0 | 5 | 0 |
| m=6 |   |   |   |   |   | 1 | 0 | 6 |
| m=7 |   |   |   |   |   |   | 1 | 0 |
| m=8 |   |   |   |   |   |   |   | 1 | of the recursion $D_{mn} = D_{m-1,\ n-1} + D_{m+1,\ n-1}$ together with $D_{mn} = 0$ for $m < 1$ and for $m > n$, Table I can be extended indefinitely. Note that $D_{mm} = 1$ and $D_{mn} = 0$ for $m+n =$ odd. Thus, for example, $$F_1 = H_1 + k^2 H_3 + 2k^4 H_5 + 5k^6 H_7 + \ldots$$

$$F_2 = H_2 + 2k^2 H_4 + 5k^4 H_6 + 14k^6 H_8 + \ldots$$

etc., and, for the circular case, $k = 0$, $$F_m = H_m \quad (5')$$

Let $dI$ be the upward current in the elements of the cylinder (3) lying between the parameter values $\theta$ and $\theta + d\theta$. Then the current distribution required to produce the field (2) within the cylinder is given by $$\frac{dI}{d\theta} = \frac{1}{4\pi} \sum_{m=1}^{\infty} r^m (F_m e^{im\theta} + F_m^* e^{-im\theta}) \quad (6)$$

where $F_m^*$ is the complex conjugate of $F_m$. For the case of a median plane field, $F_m = F_m^*$, and (6) becomes $$\frac{dI}{d\theta} = \frac{1}{2\pi} \sum_{m=1}^{\infty} r^m F_m \cos m\theta$$

With the current distribution (6) the field external to the elliptic cylinder is $$H_{\text{out}}(z) = \left[ -\sum_{m=1}^{\infty} f_m \left( \frac{2}{z + \sqrt{z^2 - c^2}} \right)^m \right] / \sqrt{z^2 - c^2} \quad (7)$$

where $$f_m = k^{2m} F_m + r^{2m} F_m^* \quad (8)$$

For the circular case $c = 2k = 0$ and $F_m = H_m$, so that expression (7) reduces to $$H_{\text{out}}(z) = -\sum_{m=1}^{\infty} \frac{r^{2m} H_m^*}{z^{m+1}} \quad (7')$$

It is possible to produce the prescribed field (2) within the inner of two confocal elliptic cylinders (or, of two coaxial circular cylinders) and, simultaneously, to cancel the field in the whole region outside of both cylinders.

Denote quantities relating to the inner and outer cylinders by single and double primes, respectively. For confocal cylinders $k$ is the same. With the $F_m$ computed from the prescribed field as in (5) we find the two required current distributions in the form (6) by setting $$F_m' = (r''^{2m} F_m + k^{2m} F_m^*)/\Delta_m \quad (9)$$

$$F_m'' = -(r'^{2m} F_m + k^{2m} F_m^*)/\Delta_m$$

where $\Delta_m = r''^{2m} - r'^{2m}$.

For the interior field we have $F_m' + F_m'' = F_m$ and for the respective exterior fields (7) we find from (8)

$$f_m' = -f_m'' = \frac{k^{2m}(r''^{2m} + r'^{2m}) F_m + (k^{4m} + r'^{2m} r''^{2m}) F_m^*}{\Delta_m} \quad (10)$$

so that superposition yields zero for the field exterior to both cylinders. For coaxial circular cylinders, $k = 0$, we have simply $$F_m' = r''^{2m} F_m / \Delta_m \quad (9')$$

$$F_m'' = -r'^{2m} F_m / \Delta_m$$

and $$f_m' = -f_m'' = r'^{2m} r''^{2m} F_m^* \Delta_m \quad (10')$$

The field between the cylinders can also be obtained by appropriate superposition. Note that for $r'' \to \infty$ all the double cylinder expressions reduce to the single cylinder case.

It is noted that we can pass from the most general case of the double elliptical cylinder to two limiting special cases. If we let the outer elliptical cylinder become infinitely large, we obtain the special case of the single elliptical cylinder. Secondly, if we let the common foci of the confocal elliptical cylinder coalesce, we obtain as the limiting case two coaxial circular cylinders. Also, in the above, elliptical cylinder formula numbers are repeated with a prime for the corresponding circular cylinder special case.

Figure 4:
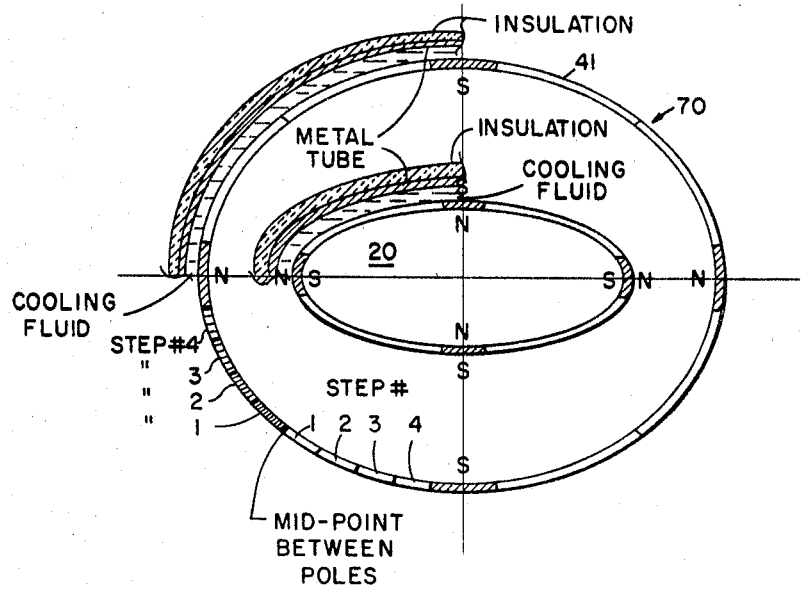
FIGURE 4 is a partial cross-section of elements corresponding to those of FIG. 3 having inner and outer cylindrical current sheets in an elliptical cross-section for producing zero external fields.

Practical embodiment 70 of the confocal elliptical current sheets of this invention is illustrated schematically in FIGURE 4, wherein is produced a zero external field and an inner elliptical cross-section, cylindrical, constant gradient, magnet field $H=Gz$ that is particularly adapted for use with the elliptical cross-section beam tube of the typical alternating gradient synchrotron, described in the above-cited patent by Collins.

In a practical embodiment of the system of this invention for an AGS accelerator having an elliptical beam tube, the outer current sheet 41 has windings energized oppositely to the inner current sheet 12 and concentric therewith. Such a quadrupole, in accordance with this invention, provides zero external field with a weight and volume much less than a conventional synchrotron magnet, such as described and shown in U.S. Patent 2,882,396, while producing a corresponding quadrupole constant gradient focusing field. An additional advantage is that a considerably greater fraction of the stored energy is contained in the beam tube so that the power supply is smaller for a given field strength.

In this practical embodiment of the system of this invention, the inner current sheet corresponds in construction to the cylindrical current sheet described in the above-cited copending applications. To this end suitably shimmed superconducting coils of ribbons are banded together to form aperture 20. In this regard suitable cryostatic cooling means circulates liquid nitrogen cooling fluid in the space around the current sheet. While a suitable energy source energizes this current sheet and adjustment means, such as rheostat adjusts the current over a wide range. In this embodiment the outer current sheet forms a container around aperture in which pump means circulates the cooling fluid. Advantageously, an outer thermally insulated container forms a chamber around outer current sheet, the pump circulates the cooling fluid into this outer chamber, from there into the inner chamber and from there back to the inlet of the pump means. The conductors, however, may be normal resistance conductors in which case the cryostats are not required.

As described in the cited copending applications a computer programmed with the above described current functions gives the number, location and dimensions of the described ribbon conductors and shims for any desired magnet shape and size. Also, the currents are adjusted to pre-programmed values in precomputed ratios to achieve the desired fields and outside field cancellation.

In operation the inner and outer current sheets both correspond in structure to the elements shown and described in the above-mentioned copending applications. Since in one embodiment the conductors thereof are superconducting in an appropriate cryostat as described, these conductors are advantageously energized continuously. They may, however, also be pulsed together. To this end, suitable power sources such as are in use at the BNL AGS may be used but suitable flux pumps may also be used. The conductors are advantageously superconducting ribbon coils that are bonded together in side-by-side arrangement around a cylindrical aperture with one edge of each ribbon turn adjacent the aperture formed thereby. Normal resistance conductors can also be used however. Suitable nonconducting shims between the ribbons provide the proper current density as described above in connection with the cited copending applications.

The well known normal resistance materials, such as copper, and the well known superconducting materials, such as $Nb_3Sn$ are advantageously arranged in the alternative in adjacent coils of ribbons disposed around the inner and outer aperture and are properly shimmed with insulators to provide the proper current density. To this end the ribbon density per unit of arc around sheets 12 and 41 increases uniformly in cross-section between the poles from a minimum adjacent the pole apertures to a maximum at the midpoint between the pole apertures. As shown in FIG. 2, these mid-points are in the plane passing through the $Z'$ axis and the respective lines 31, 33, 35 and 37. The superconductors ordinarily use a normal resistance coating for insulation between ribbon turns.

It is also understood that the current density around the circumference of the current sheet 12 and 41 can provide combined function bending and focusing. To this end the current density is adjusted by proper shimming to produce a combined magnetic bending and focusing field corresponding to that produced in the Brookhaven National Laboratory AGS. As described in the above cited copending applications, the described current functions are suitably programmed in a computer rapidly and precisely to provide the desired conducting ribbon turn number, location and current for any given ribbon dimensions as well as the location and frequency of the shims for the desired magnet size, shape and magnetic field strength.

This invention has the advantage of providing a simple, efficient, compact and easy to operate system for producing zero external magnetic fields and a high, accurate, bending and/or constant gradient focusing field for a charged particle beam over a wide range of energies, beam sizes and magnetic field shapes.

What is claimed is:
1. Magnetic field shielding apparatus for producing a zero external magnetic field around a high, accurate, internal, constant gradient magnetic field for focusing a beam of charged particles along a beam axis, comprising means consisting of a system of magnetic lenses for receiving and focusing said particles in a first cylindrical current sheet that is energized in a direction to produce a constant gradient magnetic field for focusing said particles in mutually perpendicular planes intersecting on the beam axis, and means applying to said first cylindrical current sheet an opposite, concentric, outer, second corresponding cylindrical current sheet in the space surrounding said first cylindrical current sheet for effecting the distribution of the magnetic field lines of force between said first and second cylindrical current sheets to produce a zero field external to said second cylindrical current sheet in accordance with the constant gradient magnetic field inside said first cylindrical current sheet.

2. The magnetic field shielding apparatus of claim 1 in which said first and second cylindrical current sheets consist of concentric inner and outer longitudinally extending quadrupole magnets with opposing north and south poles that coincide with each other.

3. The magnetic field shielding apparatus of claim 1 in which the inner and outer current sheets are right circular cylinders with radii in the ratio 2:1 and produce an inner quadrupole field, and the linear current density of the outer second cylindrical current sheet is opposite and ⅛ in magnitude compared to the linear current density of the inner first cylindrical current sheet.

4. The magnetic field shielding apparatus of claim 1 in which the outer second cylindrical current sheet is energized in parallel with said first inner cylindrical current sheet actively to shield the inner current sheet at different magnetic field strengths to provide a zero external magnetic field around said second outer cylindrical current sheet.

5. The magnetic field shielding apparatus of claim 1 in which the first and second cylindrical inner and outer current sheets are confocal elliptical current sheets and produce an internal combined focusing and bending field such as used in synchrotrons.

6. The magnetic field shielding apparatus of claim 1 in which the first and second cylindrical inner and outer current sheets each comprise corresponding quadrupole magnets.

References Cited
UNITED STATES PATENTS

| | | | |
|---|---|---|---|
| 2,864,963 | 12/1958 | Dornstreich et al. | 307—91 |
| 3,032,678 | 5/1962 | Glaser | 315—8 |
| 3,378,691 | 4/1968 | Swartz | 335—216 X |

JAMES W. LAWRENCE, Primary Examiner

PALMER C. DEMEO, Assistant Examiner

U.S. Cl. X.R.

313—84, 154; 335—214, 216